United States Patent
Torkelson et al.

(10) Patent No.: US 11,999,812 B2
(45) Date of Patent: Jun. 4, 2024

(54) RECYCLABLE CROSSLINKED POLYMER NETWORKS CONTAINING DYNAMIC DIALKYL AMINO DISULFIDE LINKAGES

(71) Applicant: Northwestern University, Evanston, IL (US)

(72) Inventors: John M. Torkelson, Skokie, IL (US); Mohammed Abdulaziz Bin Rusayyis, Evanston, IL (US)

(73) Assignee: Northwestern University, Evanston, IL (US)

( * ) Notice: Subject to any disclaimer, the term of this patent is extended or adjusted under 35 U.S.C. 154(b) by 164 days.

(21) Appl. No.: 17/380,259

(22) Filed: Jul. 20, 2021

(65) Prior Publication Data

US 2022/0025096 A1    Jan. 27, 2022

Related U.S. Application Data

(60) Provisional application No. 63/054,365, filed on Jul. 21, 2020.

(51) Int. Cl.
*C08F 293/00*    (2006.01)

(52) U.S. Cl.
CPC ...... *C08F 293/005* (2013.01); *C08F 2438/00* (2013.01); *C08F 2810/10* (2013.01); *C08F 2810/20* (2013.01)

(58) Field of Classification Search
CPC .............. C08F 293/005; C08F 2438/00; C08F 2810/10; C08F 2810/20; C08F 120/14; C08F 220/1806; C08K 5/44; C08K 5/3435
See application file for complete search history.

(56) References Cited

U.S. PATENT DOCUMENTS

| 2017/0081449 | A1 | 3/2017 | Torkelson et al. | |
| 2022/0153698 | A1* | 5/2022 | Otsuka | C09D 7/63 |

OTHER PUBLICATIONS

Maillard et al., "Kinetic Applications of Electron Paramagnetic Resonance Spectroscopy. XXII. Dialkylaminothiyl Radicals," *Journal of the American Chemical Society*, 98: 2 Jan. 21, 1976, pp. 520-523.

Danen et al., "The Ease of Formation of Thionitroxide Radicals," *Journal of the American Chemical Society*, 98:2, Jan. 21, 1976, pp. 516-520.

Takahashi et al., "Thermally Healable and Reprocessable Bis(hindered amino)disulfide-Cross-Linked Polymethacrylate Networks," *ACS Macro Lett.* 2017, 6, pp. 1280-1284.

Lingqiao Li, Dissertation, Dynamic Chemistries in Non-linear Polymer Systems: From Applications for Sustainability to Fundamental Theories, Sep. 2019, 283 pages.

Takahashi et al., Thermally Adjustable Dynamic Disulfide Linkages Mediated by Highly Air-Stable 2,2,6,6-Tetramethyle-piperidine-1sulfanyl (TEMPS) Radicals, *Agnew. Chem. Int. Ed.* 2017, 56, 2016- 2021.

Rusayyis et al., "Reprocessable covalent adaptable networks with excellent elevated-temperature creep resistance: facilitation by dynamic, dissociative bis(hindered amino) disulfide bonds," *Polym. Chem.*, 2021, 12, 2760.

Rusayyis et al., "Recyclable Polymethacrylate Networks Containing Dynamic Dialkylamino Disulfide Linkages and Exhibiting Full Preoperty Recovery," *Macromolecules* 2020, 53, 8367-8373.

* cited by examiner

*Primary Examiner* — Robert C Boyle
(74) *Attorney, Agent, or Firm* — Bell & Manning, LLC

(57) ABSTRACT

A composition for forming a dynamic crosslinked polymer network may comprise (a) a dynamic crosslinker having formula R—R"R'N—S—S—NR'R"—R, wherein each R is a polymerizable group comprising a carbon-carbon (C—C) double bond capable of undergoing free radical polymerization and each R' and each R" are independently selected alkyl groups; (b) a polymer comprising a C—C double bond capable of undergoing free radical polymerization, a monomer comprising a C—C double bond capable of undergoing free radical polymerization, or combinations thereof; and (c) a free radical initiator, wherein the dynamic crosslinker does not comprise a urethane group.

15 Claims, 9 Drawing Sheets

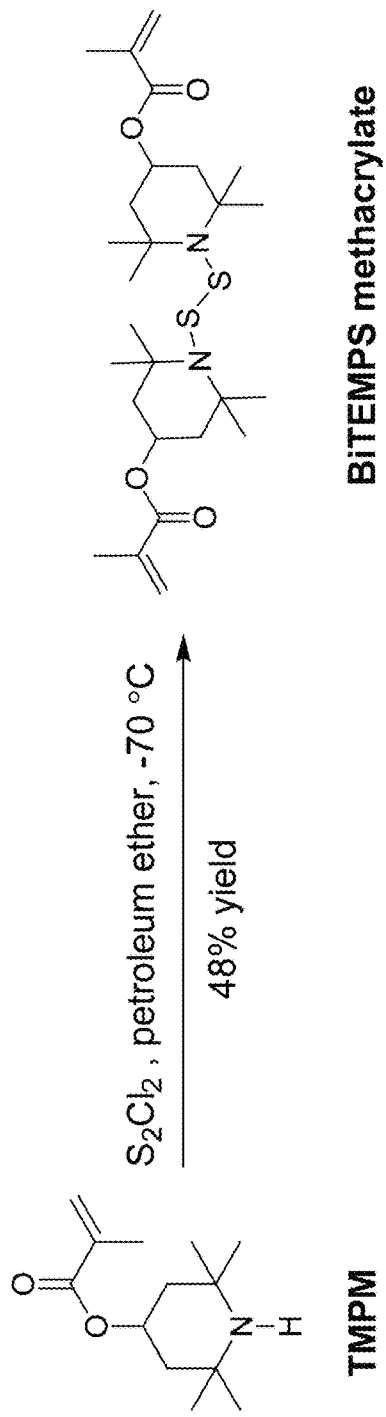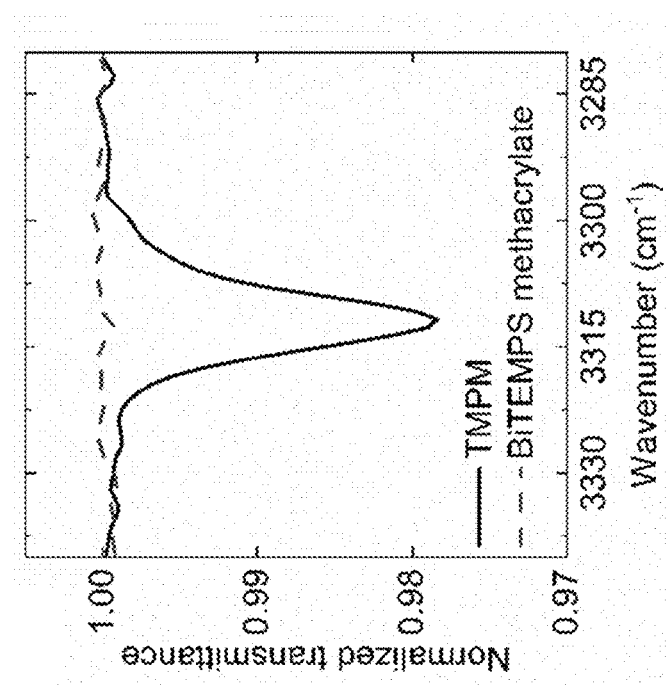
FIG. 1A
FIG. 1B

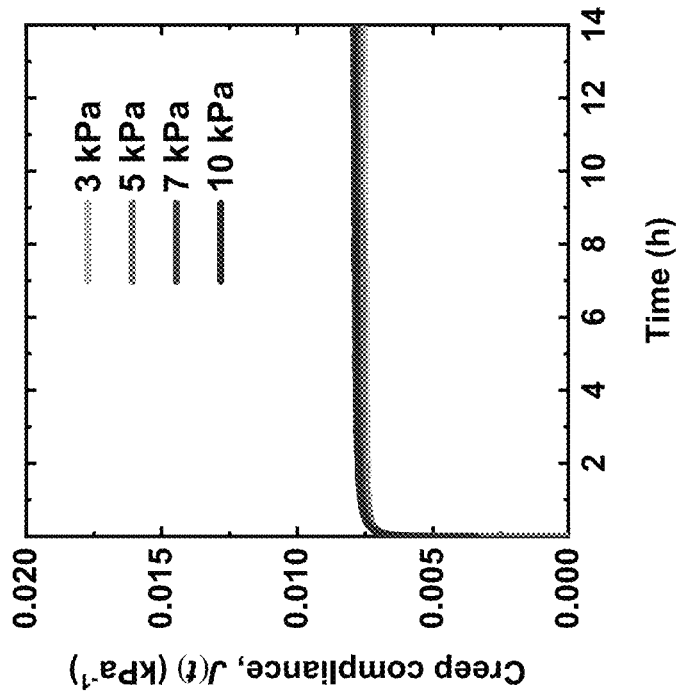
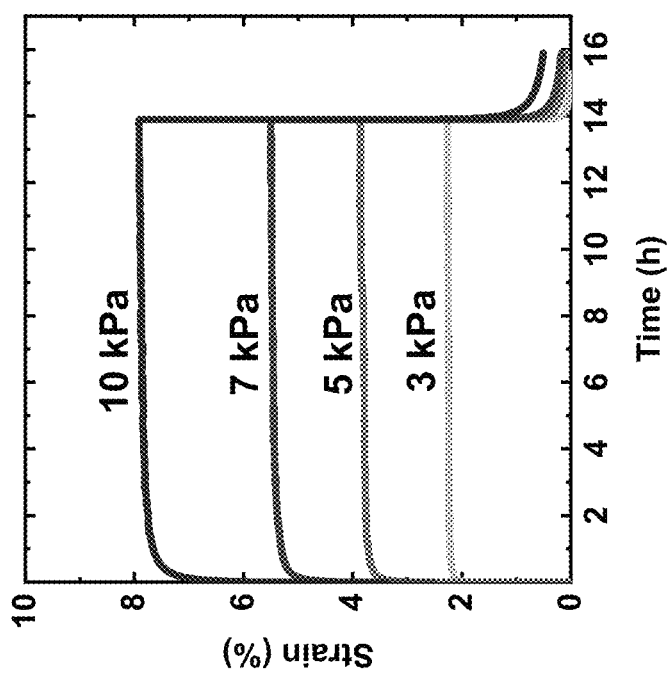
FIG. 7B
FIG. 7A

RECYCLABLE CROSSLINKED POLYMER NETWORKS CONTAINING DYNAMIC DIALKYL AMINO DISULFIDE LINKAGES

CROSS-REFERENCE TO RELATED APPLICATIONS

The present application claims priority to U.S. provisional patent application No. 63/054,365 that was filed Jul. 21, 2020, the entire contents of which are incorporated herein by reference.

BACKGROUND

Conventional polymer networks, also known as thermosets, are used in an array of applications because of their excellent mechanical properties, high heat stability, and outstanding chemical resistance. Unfortunately, their lack of recyclability due to the presence of permanent crosslinks results in major economic and sustainability losses. To overcome this issue, for the past two decades substantial research has focused on reprocessable polymer networks. Also known as covalent adaptable networks (CANs), reprocessable networks contain dynamic covalent bonds that are capable of dissociating or exchanging in response to external stimuli, rendering them malleable. The dynamic chemistries can be classified into two types: dissociative and associative. Dissociative dynamic chemistry involves reversible reactions in which covalent bonds break and reform reversibly by means of dissociation upon applying a stimulus (e.g., heat) and recombination upon stimulus removal. Examples of dissociative dynamic chemistry include Diels-Alder reversible reactions and alkoxyamine dynamic bonds. In contrast, associative dynamic chemistry involves the rearrangement of covalent bonds via exchange reactions between functional groups in the network. CANs that exclusively undergo associative exchange reactions have been called vitrimers. Examples of associative dynamic chemistry include transesterification and transamination exchange reactions.

Although many dynamic chemistries have been exploited in studies aimed at synthesizing reprocessable networks, most of the few studies that have reported full crosslink density recovery after reprocessing were focused on step-growth polymer networks. With the exception of a single study on alkoxyamine dynamic networks prepared by reacting polymer containing multiple carbon-carbon (C—C) double bonds amenable to radical polymerization (polybutadiene) and styrene via nitroxide-mediated polymerization (NMP), no previous study has demonstrated full crosslink density recovery within error of addition-type reprocessable polymer networks after recycling. (Jin, K. et al., *Adv. Mater.* 2016, 28, 6746-6750.) Even in the case of Jin et al., 2016 with the alkoxyamine networks prepared via NMP and cross-linked by 4-methacryloyloxy-2,2,6,6-tetramethylpiperidine-1-oxyl (TEMPO methacrylate), when networks were synthesized exclusively from monomer yielding styrene/n-butyl acrylate copolymer networks (and not including polymer containing multiple C—C double bonds amenable to radical polymerization), the cross-link densities of the synthesized networks were not fully recovered after reprocessing. Thus, there remains an important gap in the field of reprocessable networks—the development of polymer networks exclusively from addition-type monomers that exhibit full crosslink density recovery within error after multiple reprocessing steps.

SUMMARY

Compositions for forming dynamic crosslinked polymer networks, the networks, methods of forming the networks, and methods for reprocessing the networks are provided.

In embodiments, a composition for forming a dynamic crosslinked polymer network comprises (a) a dynamic crosslinker having formula R—R"R'N—S—S—NR'R"—R, wherein each R is a polymerizable group comprising a carbon-carbon (C—C) double bond capable of undergoing free radical polymerization and each R' and each R" are independently selected alkyl groups; (b) a polymer comprising a C—C double bond capable of undergoing free radical polymerization, a monomer comprising a C—C double bond capable of undergoing free radical polymerization, or combinations thereof; and (c) a free radical initiator, wherein the dynamic crosslinker does not comprise a urethane group. Methods for forming a dynamic crosslinked polymer network from such compositions are also provided.

In embodiments, a dynamic crosslinked polymer network comprises polymer chains covalently linked by dialkylamino disulfide linkages formed from a dynamic crosslinker having formula R—R"R'N—S—S—NR'R"—R, wherein each R is a polymerizable group comprising a carbon-carbon (C—C) double bond capable of undergoing free radical polymerization and each R' and each R" are independently selected alkyl groups, wherein the dynamic crosslinker does not comprise a urethane group. Methods for reprocessing such dynamic crosslinked polymer networks are also provided.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 1A shows synthesis of BiTEMPS methacrylate; FIG. 1B shows normalized FTIR transmittance of TMPM and BiTEMPS methacrylate.

FIGS. 7A-7B show curves for the XLPHMA-5 network (polymethacrylate networks cross-linked with 5 mol % BiTEMPS methacrylate) showing (FIG. 7A) creep and creep recovery and (FIG. 7B) creep compliance (J(t)=ε(t)/σ) at 70° C.

DETAILED DESCRIPTION

Figure 1C:
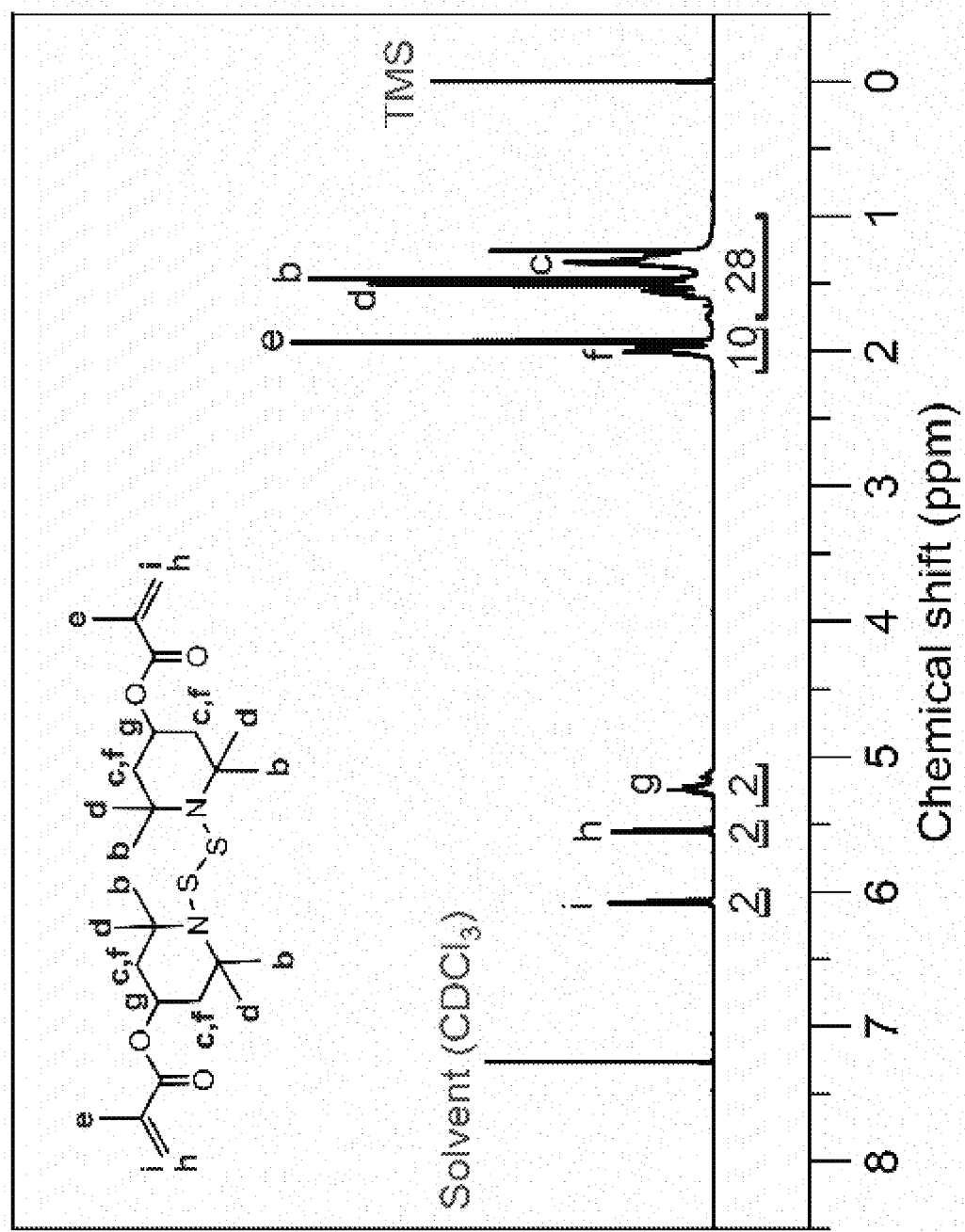
FIG. 1C shows $^1$H NMR spectrum of BiTEMPS methacrylate.

Compositions for forming dynamic crosslinked polymer networks, the networks, methods of forming the networks, and methods for reprocessing the networks are provided. The polymer chains of the networks are covalently linked via dynamic crosslinkers comprising a reversible dialkylamino disulfide linkage which dissociates at elevated temperatures and recombines upon cooling. As demonstrated herein, networks formed using the disclosed dynamic crosslinkers can be reprocessed multiple times with full recovery of crosslink density. The networks also exhibit surprisingly high creep resistance at elevated temperatures.

The dynamic crosslinked polymer networks may be synthesized by forming a composition comprising a dynamic crosslinker comprising a dialkylamino disulfide group and two polymerizable groups, each polymerizable group comprising a carbon-carbon (C—C) double bond capable of undergoing free radical polymerization; a polymer comprising a C—C double bond capable of undergoing free radical polymerization, a monomer comprising a C—C double bond capable of undergoing free radical polymerization, or combinations thereof; and a free radical initiator.

The dynamic crosslinkers are polymerizable dialkylamino disulfides which may be represented by Formula I: R—R"R'N—S—S—NR'R"—R. In this formula, each R represents the polymerizable group comprising the carbon-carbon double bond capable of undergoing free radical polymerization. The two polymerizable groups may be the same or different. Within each polymerizable group R, the carbon-carbon double bond moiety may be represented by WXC=CYZ. In this formula, one of W, X, Y, Z, represents a covalent bond to an NR'R" group of Formula I (or a covalently bound linking group thereto), and the remaining ones of W, X, Y, Z, may be independently selected from hydrogen, alkyl groups, halogens, etc. In other words, the carbon-carbon double bond moiety may be a vinyl moiety, a vinylidene moiety, an allyl moiety, etc. Illustrative R groups include acrylate, methacrylate, styrene, and vinyl pyridine. Taking methacrylate (—OCOCHCH$_2$) as an example of an R group, W is —OCO—, X is methyl, Y, and Z are hydrogen. The R groups may be unsubstituted or substituted (see the definition of these terms with respect to the definition of "alkyl" groups below). Each R' and each R" (on each N) represents an alkyl group (again, see the definition of "alkyl" groups below). The R' and R" groups may be the same or different and may be unsubstituted or substituted. In addition, an R' group and an R" group bound to the same nitrogen atom may be covalently bound together to form a cycloalkyl group containing the nitrogen atom. An illustrative N-containing cycloalkyl group is the piperidyl group of Formula IA, below. At least in embodiments, the polymerizable dialkylamino disulfide does not comprise a urethane group. More specifically, although R, R' and R" may be substituted as described above, at least in embodiments, neither R, nor R', nor R" comprises a urethane group (or forms a urethane group with a neighboring group).

In embodiments, the dynamic crosslinker has Formula IA:

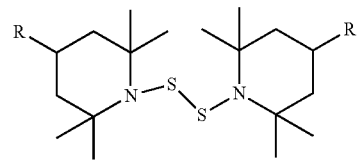

wherein each R represents the polymerizable group comprising the carbon-carbon double bond capable of undergoing free radical polymerization. (See FIG. 4C.) As noted above, the two polymerizable groups may be the same or different and may be substituted or unsubstituted. However, R does not comprise a urethane group and does not form a urethane group with a neighboring group.

In embodiments, the dynamic crosslinker is bis(2,2,6,6-tetramethyl-4-piperidyl methacrylate) disulfide (BiTEMPS methacrylate. (See FIG. 1A.)

The dynamic crosslinker is not any of the crosslinkers disclosed in Takahashi, A., et al. *Angew. Chem., Int. Ed.* 2017, 56, 2016-2021 and Takahashi, A., et al. *ACS Macro Lett.* 2017, 6, 1280-1284, i.e., the dynamic crosslinker is not one which is prepared from 2-isocyanatoethyl acrylate and BiTEMPS diol using isocyanate-based condensation chemistry. Such dynamic crosslinkers necessarily comprise urethane groups.

Various polymers and monomers may be used in forming the dynamic crosslinked polymer network, provided they each comprise at least one C—C double bond capable of undergoing free radical polymerization. Illustrative monomers include those having the formula $R_1R_2C=CR_3R_4$. Each of $R_1$-$R_4$ may be independently selected from hydrogen, halogen, alkyl, aryl, arylalkyl, alkenyl, arylalkenyl, alkoxycarbonyl, and alkylaminecarbonyl. Thus, the monomers may be vinyl monomers, including styrene, vinyl pyridine, acrylate, methacrylate, acrylonitrile, vinyl acetate, vinyl chloride, isoprene. Substituted or unsubstituted versions of such vinyl monomers may be used. Combinations of different monomers may be used. In embodiments, the composition comprises only monomers, no polymers.

Polymers which may be used include, for example, polybutadiene and polyisoprene. The polymer may be a homopolymer or a co-polymer, e.g., copolymers containing butadiene such as styrene-butadiene block copolymers, random (statistical) copolymers, gradient copolymers, graft copolymers, etc. may be used. Copolymers containing isoprene such as styrene-isoprene block copolymers, random (statistical) copolymers, gradient copolymers, graft copolymers, etc. may also be used. Combinations of different polymers may be used.

After forming the composition, synthesizing the dynamic crosslinked polymer network further involves generating free radicals from the free radical initiator present in the composition. These free radicals attack the any of the C—C double bonds described above, e.g., those present in the monomers, polymers, and the dynamic crosslinker (e.g., BiTEMPS methacrylate). In the case of monomers, this results in chain propagation to form polymer chains (e.g., acrylate monomers polymerized to form polyacrylate chains). During this process, the dynamic crosslinker becomes incorporated into polymer chains via one of its C—C double bond containing polymerizable groups. Since the dynamic crosslinker is bifunctional, polymer chains (or different portions of an individual polymer chain) become covalently linked together via dialkylamino disulfide linkages, thereby forming the network. In the case of polymers, similar incorporation and crosslinking occur to form the network without the need for chain propagation.

A variety of free radical initiators may be used. The free radical initiator may be one capable of generating the free radicals at relatively low temperatures to prevent dissociation of the dialkylamino disulfide linkages. Suitable such initiators include azo initiators such as azo nitriles. An illustrative azo nitrile is 2,2'-Azobis(4-methoxy-2,4-dimethylvaleronitrile) (V-70), which thermally decomposes to free radicals at room temperature (20° C. to 25° C.). However, other free radical initiators which require higher temperatures to generate free radicals may be used. For example, the dynamic crosslinked polymer network has been synthesized using azobisisobutyronitrile at about 70° C. (This example is merely illustrative, the synthesis may be carried out at higher temperatures such as 80° C., 90° C., 100° C., 110° C., 120° C., 130° C., etc.) Other similar free radical initiators may be used. The free radical initiator may be present in the composition at various amounts, e.g., an amount in a range of from 0.001 mol % to 10 mol % (mol % refers to the (moles of initiator)/(total moles of monomer units and dynamic crosslinker)*100).

Similarly, the dynamic crosslinker may be present in the composition at various amounts. Illustrative amounts include at least 3 mol %, at least 4 mol %, at least 5 mol %, or in a range of from 3 mol % to 10 mol % (mol % refers to the (moles of dynamic crosslinker)/(total moles of monomer units and dynamic crosslinker)*100).

The composition used to form the dynamic crosslinked polymer network may comprise other components, e.g., solvent selected to solubilize/dissolve the dynamic crosslinker and monomer/polymer. Other additives may be included, e.g., depending upon desired properties for the network.

The conditions under which the dynamic crosslinked polymer network is synthesized from the composition include the temperature. Low temperatures may be used to prevent dissociation of the dialkylamino disulfide linkages. This includes temperatures in the range of from 20° C. to 30° C. However, as noted above, higher temperatures may be used, e.g., up to 130° C. The conditions may also involve use of inert gas (e.g., $N_2$ gas). These conditions may be applied for a period of time sufficient to achieve full (within 10%, within 5%, within 2%) crosslinking density. Illustrative times include 1 hour, 2 hours, 10 hours, 24 hours. The degree of crosslinking may be determined using dynamical mechanical analysis (DMA) as described in the Example, below.

Figure 4A:
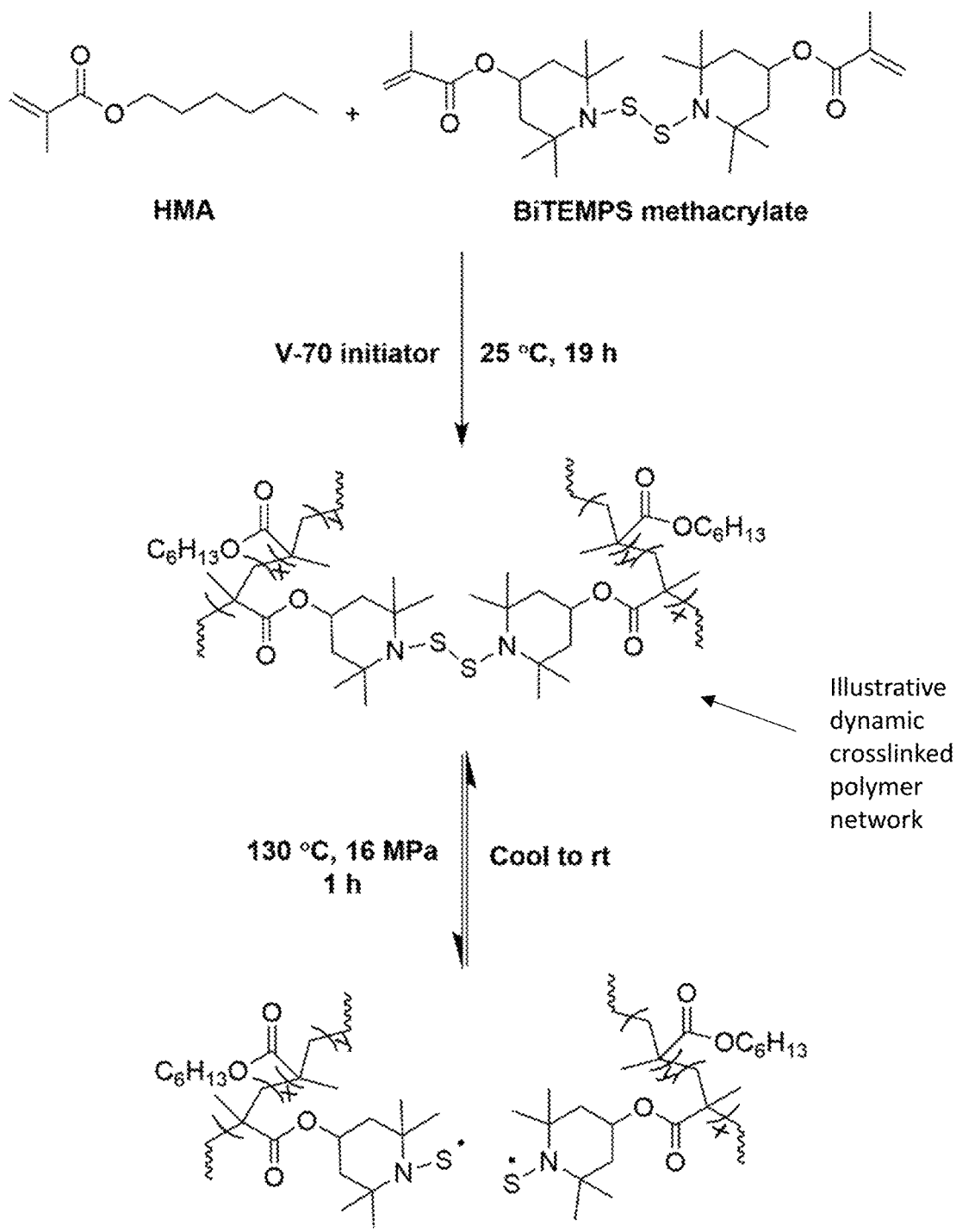
FIG. 4A shows a synthesis and rearrangement mechanism of poly(HMA-co-BiTEMPS methacrylate) networks.
Figure 4B:
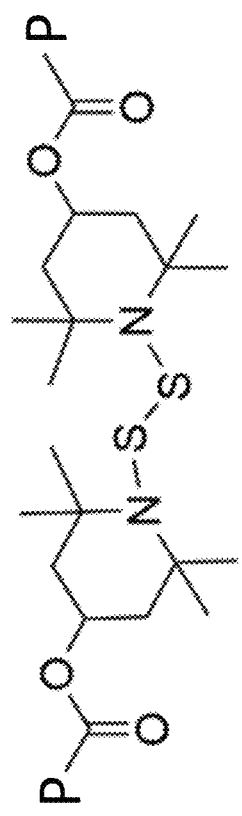
FIG. 4B shows crosslinked polymer chain(s) in an illustrative dynamic crosslinked polymer network formed using BiTEMPS methacrylate.
Figure 4C:
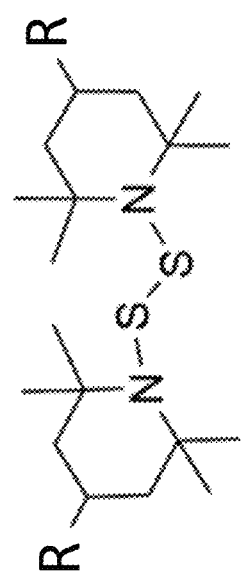
FIG. 4C shows an illustrative BiTEMPS-based dynamic crosslinker.

The resulting dynamic crosslinked polymer network is characterized polymer chains covalently linked via the dialkylamino disulfide linkages. Using the BiTEMPS methacrylate dynamic crosslinker as an illustrative example, crosslinked polymer chains in the network may be represented by the chemical structure shown in FIG. 4B. The label "P" represents different polymer chains or portions of an individual polymer chain. Since other R', R" groups may be used besides the piperidyl group of FIG. 4B, more generally, the crosslinked polymer chains in the network may be represented by P—R"R'N—S—S—NR'R"—P. The polymer chain(s) may be the polymerization product of any of the C—C double-bond containing monomers described above (e.g., polyacrylates) or any of the C—C double-bond containing polymers described above (e.g., polyisoprenes). The chemical structure of an illustrative network is shown in FIG. 4A. The network was formed using BiTEMPS methacrylate as the dynamic crosslinker and hexamethyl acrylate monomers.

The dynamic crosslinked polymer networks may be reprocessed by heating them from a temperature at which dissociation of the dialkylamino disulfide linkages is inactive or substantially inactive, such as room temperature, to an elevated temperature at which the dissociation is activated or significantly enhanced. (See FIG. 4A.) Illustrative elevated temperatures include those of at least 120° C., at least 130° C., or in a range of 120° C. to 160° C. The network may be reshaped (e.g., remolded) and cooled, e.g., to room temperature. During cooling, the dialkylamino disulfide linkages recombine, thereby reforming the network. A single reprocessing cycle refers to a single round of heating, reshaping, and cooling. Notably, the heating used to reprocess the networks can be quite short (e.g., 5 hours, 2 hours, 1 hour, or less) and still provide the reprocessed network with full recovery of crosslinking density (as compared to the initial network prior to any reprocessing).

The dynamic crosslinked polymer networks may be characterized by properties including crosslinking density after reprocessing. As noted above, the network may be characterized by full recovery of crosslinking density after being subject to a reprocessing cycle. Recovery of crosslinking density may be measured by measuring tensile storage modulus E' values and glass transition temperature $T_g$ values using DMA as described in the Example below. Full recovery means that the E' and/or $T_g$ values for the reprocessed network are the same (within error) of the initial network prior to any reprocessing. (See FIG. 2.) The reprocessing cycle may be that used in the Example below, e.g., 130° C. for 1 hour and compression into sheets at 16 MPa. Full recovery of crosslinking density may be obtained after one, two, or more cycles of reprocessing.

Similarly, the dynamic crosslinked polymer networks may be characterized by the absence of creep at elevated temperatures. A creep test is a measurement of continuous deformation or strain that a material experiences as a function of time while under continuous, constant, uniaxial or shear load at constant temperature. For example, a creep test may be carried out as described in the Examples below. In embodiments, the creep test is carried out as describe in Example 2, i.e., using a constant stress of 3000 Pa for 50,000 seconds followed by 7,200 seconds of recovery (zero stress). From such data, creep strain values (Δε) are calculated as the difference in strain at t=50,000 s and t=1800 s. An "absence of creep" may refer to obtaining a Δε that is less than 0.005, less than 0.003, less than 0.002, or less than 0.001. Thus, although the phrase "absence of creep" encompasses Δε=0, the network need not exhibit a Δε of precisely zero to be considered absent of creep. The Δε values may be reported with respect to a particular temperature, e.g., 70° C., 80° C., or 90° C.

The dynamic crosslinkers are also provided, including BiTEMPS methacrylate.

The following definitions may be used herein:

Alkyl group refers to a linear, branched or cyclic alkyl group in which the number of carbons may range from, e.g., 1 to 24, 1 to 12, 1 to 6, or 1 to 4. The alkyl group may be unsubstituted, by which it is meant the alkyl group contains no heteroatoms. The alkyl group may be substituted, by which it is meant an unsubstituted alkyl group in which one or more bonds to a carbon(s) or hydrogen(s) are replaced by a bond to non-hydrogen and non-carbon atoms.

Alkenyl group refers to a mono- or polyunsaturated, linear, branched or cyclic alkenyl group in which the number of carbons may range from, e.g., 2 to 24, 2 to 12, 2 to 6, etc. The alkenyl group may be unsubstituted or substituted as described above with respect to alkyl groups.

Aryl group refers to a monocyclic aryl group having one aromatic ring or a polycyclic group having fused aromatic rings (e.g., two, three, etc. rings). Monocyclic aryl groups may be unsubstituted or substituted as described above with respect to alkyl groups. However, substituted monocyclic aryl groups also refer to an unsubstituted monocyclic aryl group in which one or more carbon atoms are bonded to an unsubstituted or substituted alkane (i.e., arylalkyl), an unsubstituted or substituted alkene (i.e., arylalkenyl), or an unsubstituted or substituted monocyclic aryl group or a polycyclic aryl group. The meaning of unsubstituted and substituted alkanes and unsubstituted and substituted alkenes follows the meaning described above for unsubstituted and substituted alkyl and alkenyl groups, respectively. Polycyclic aryl groups are unsubstituted.

Alkoxycarbonyl group refers to an RCOOR' group in which R and R' are independently selected from unsubstituted or substituted alkyl groups.

Alkylaminecarbonyl group refers to an RCONR'R" group in which R, R', and R" are independently selected from unsubstituted or substituted alkyl groups.

EXAMPLES

Example 1

Introduction

Figure 3:
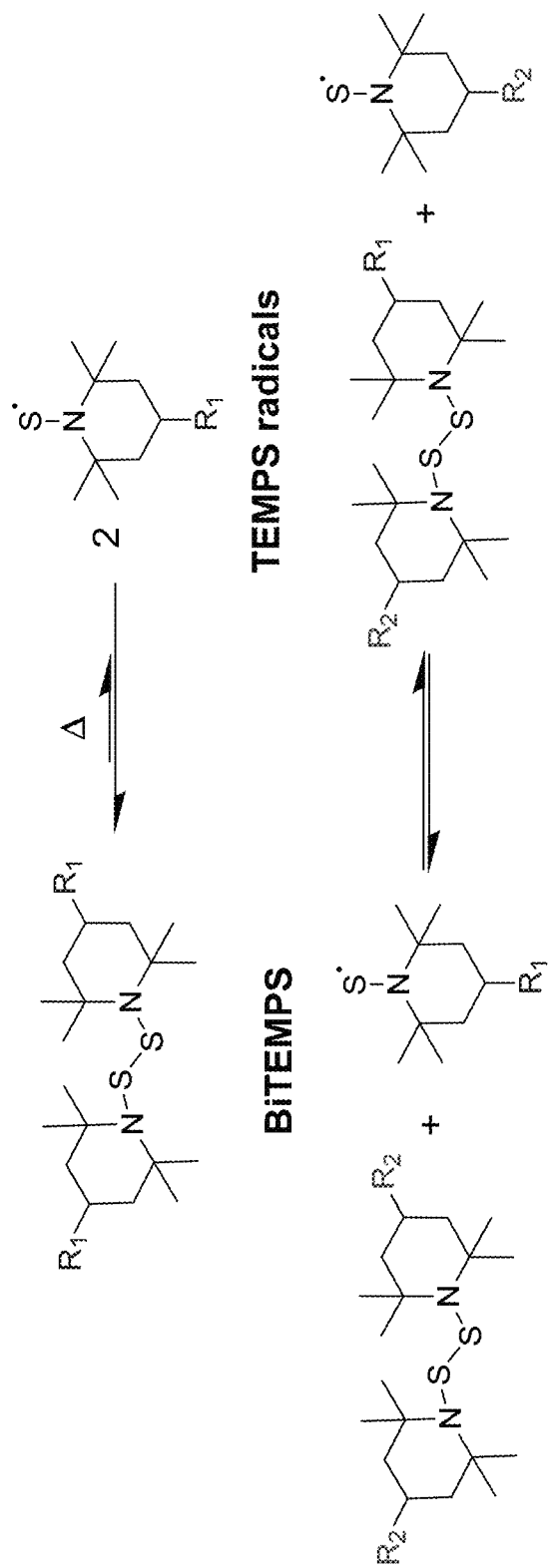
FIG. 3 shows radical-mediated dynamic exchange mechanism in BiTEMPS.

Here, bis(2,2,6,6-tetramethyl-4-piperidyl methacrylate) disulfide (BiTEMPS methacrylate) was developed, which can be synthesized in one step without need for purification. This Example demonstrates that BiTEMPS methacrylate may be used in the synthesis of reprocessable networks with dynamic covalent bonds from monomers and/or polymers containing carbon-carbon double bonds that are amenable to free radical polymerization. Because BiTEMPS methacrylate exists in dimer form at room temperature, networks cross-linked with BiTEMPS methacrylate do not generate any carbon-centered radicals during (re)processing. This avoids the irreversible termination of carbon-centered radicals generated via the dissociation of alkoxyamine cross-links during reprocessing. The structure and dynamic mechanism of BiTEMPS is illustrated in FIG. 3.

Unlike BiTEMPS methacrylate, the cross-linker described in Takahashi, A., et al. *Angew. Chem., Int. Ed.* 2017, 56, 2016-2021 and Takahashi, A., et al. *ACS Macro Lett.* 2017, 6, 1280-1284 requires multiple synthesis and purification steps, which may limit its practicality and commercial viability. To the best of the inventors' knowledge, no other research group has reported the use of BiTEMPS chemistry to make reprocessable polymer networks, and no previous study has demonstrated full cross-link density recovery of BiTEMPS-cross-linked networks after recycling. Here, the utility of BiTEMPS methacrylate as a dynamic cross-linker in the synthesis of recyclable polymethacrylate networks with full cross-link density recovery (within error) is demonstrated.

Experimental

Materials

All chemicals are commercially available and used as received unless otherwise stated. Petroleum ether (anhydrous), sulfur monochloride (98%), hexyl methacrylate (HMA, 98%), N,N-dimethylacetamide (DMAc, anhydrous, 99.8%), 1,4-Dioxane (anhydrous, 99.8%), toluene (99.9%) and chloroform-d (99.8 atom % D) were purchased from Sigma-Aldrich. Petroleum ether and DMAc were dried over 4 Å molecular sieves for at least 48 h before use. Hexyl methacrylate monomers were de-inhibited using inhibitor remover prior to using. Dichloromethane (DCM, Certified ACS) and methanol (99.9%) were purchased from Fisher Scientific. 2,2,6,6-Tetramethyl-4-piperidyl methacrylate (TMPM) was supplied by TCI America. The low-temperature initiator V-70 azo initiator was obtained from FUJIFILM Wako Chemicals.

SYNTHESIS

Synthesis of Bis(2,2,6,6-Tetramethyl-4-piperidyl methacrylate) disulfide (BiTEMPS Methacrylate)

2,2,6,6-Tetramethyl-4-piperidyl methacrylate (8.780 g, 38.96 mmol) was dissolved in pre-dried petroleum ether (90 ml). The solution was cooled to −70° C. and then sulfur monochloride (1.30 g, 9.65 mmol) mixed with pre-dried petroleum ether (1.25 ml) was added to the solution dropwise while stirring vigorously. The solution was allowed to stir at −70° C. for 15 min followed by stirring at room temperature for 30 min. The mixture was then poured in distilled water and stirred at room temperature overnight. The resulting cream-colored precipitates were filtered off and dried in a vacuum oven at 40° C. for 48 h to yield BiTEMPS methacrylate (2.36 g, 48%). Anal. Calcd. for $C_{26}H_{44}N_2O_4S_2$: N, 5.46; S, 12.51. Found: N, 5.36; S, 12.64.

Synthesis of poly(hexyl methacrylate-co-BiTEMPS methacrylate) Networks

In a typical synthesis of poly(hexyl methacrylate-co-BiTEMPS methacrylate) networks, HMA (4.000 g, 23.49 mmol), BiTEMPS methacrylate (635.7 mg, 1.24 mmol), and pre-dried DMAc (4.8 ml) were mixed in a 20-mL scintillation vial. The mixture was stirred at room temperature until BiTEMPS methacrylate completely dissolved. The mixture was then bubbled with $N_2$ gas for 20 min at 25° C., after which V-70 initiator (76.32 mg) was added to the mixture. $N_2$ gas bubbling was continued with stirring at 25° C. After 50 min, $N_2$ bubbling was stopped, but $N_2$ gas was allowed to continuously flow into the vial. The mixture gelled within 70 min, and the reaction was allowed to proceed overnight to ensure complete conversion. The reaction was then quenched by exposing it to air. The obtained elastomeric solid product was cut into pieces and washed with DCM/methanol mixtures (3/1, 1/1, 1/3 ratios) at least three times to remove any unreacted reagents. After washing, the solid pieces were dried in a vacuum oven gradually with temperature increasing from room temperature to 80° C. over a total time of 24 h.

Synthesis of Linear Poly(Hexyl Methacrylate)

Linear poly (hexyl methacrylate) was synthesized in a similar manner as the poly(HMA-co-BiTEMPS methacrylate) networks. HMA (2.000 g, 11.74 mmol) was added in a 20-ml scintillation vial, and it was bubbled with $N_2$ gas at 25° C. After 20 min, V-70 initiator (38.1 mg) was added to the vial, and $N_2$ gas bubbling was continued with stirring for 50 minutes. $N_2$ bubbling was then stopped, but $N_2$ gas was allowed to continuously flow into the vial. The reaction was allowed to proceed overnight, after which a sticky solid was obtained and used directly for characterization.

Molding and Reprocessing of Poly(HMA-Co-BiTEMPS Methacrylate) Networks

The synthesized poly(HMA-co-BiTEMPS methacrylate) networks were molded into sheets using a PHI press (Model 0230C-X1). The dried network pieces were cut into millimeter-sized pieces and hot pressed into ~1 mm sheets at 130° C. with a 10-ton ram force (~16 MPa) for 1 h. After molding, samples were cooled to room temperature in a cold compression mold with a 4-ton ram force for 5 min. The obtained sheet was considered to be the $1^{st}$ molded sample. A sample of this sheet was cut into pieces and reprocessed using the same processing conditions to give the $2^{nd}$ molded sample. The same procedure was repeated to obtain the $3^{rd}$ molded sample.

Characterization

FTIR

Attenuated total reflectance-Fourier transform infrared (ATR-FTIR) spectroscopy was performed using a Bruker Tensor 37 FTIR spectrophotometer with a diamond/ZnSe attachment. Samples were scanned at room temperature with a 4 $cm^{-1}$ resolution. The scans (16 scans) were collected over the 4000 to 600 $cm^{-1}$ range. Conversion of the amine groups in TMPM was determined by the disappearance of the N—H stretch peak at 3312 $cm^{-1}$. FTIR spectroscopy was also used to characterize the chemical change of the network samples after each molding cycle.

$^1$H NMR

BiTEMPS methacrylate was characterized by $^1$H NMR spectroscopy. The spectroscopy was performed at room temperature using a Bruker Avance III 500 MHz NMR spectrometer where deuterated chloroform ($CDCl_3$) was used as the solvent.

Swelling

Swelling tests were used to determine the gel content and swelling ratio in the as-synthesized as well as the reprocessed networks. In the swelling test, small rectangular pieces of the networks (~10-50 mg) were placed in ~20 ml of either toluene or 1,4-dioxane in a glass vial at room temperature. The networks were left to swell in the swelling solvents for 72 h, after which the solvents were decanted. The swollen networks were immediately weighed after removing the remaining solvent on the network surface. The networks were then dried in a vacuum oven for 3 days and weighed afterwards. The gel content was calculated as $m_d/m_0$, and the swelling ratio was calculated as $(m_s-m_d)/m_d$, where $m_0$ is the original mass of the sample before the swelling test, $m_s$ is the mass of the swollen sample, and $m_d$ is the mass of dried sample after the swelling.

Dynamic Mechanical Analysis (DMA)

DMA was used to measure the thermomechanical properties of the reprocessed poly(HMA-co-BiTEMPS methacrylate) networks after each molding cycle. In this test, a TA Instruments RSA-G2 Solids Analyzer was used to measure the storage modulus (E'), the loss modulus (E"), and the damping ratio (tan δ) of the networks as functions of temperature under nitrogen atmosphere. The analyzer was operated in tension mode at a frequency of 1 Hz and 0.03% oscillatory strain. All data were obtained upon heating the rectangular specimens from −55° C. to 140° C. (or 200° C. for the high temperature DMA test) with a heating rate of 3° C./min. Three measurements were performed for each sample.

Creep Behavior

Figure 6:
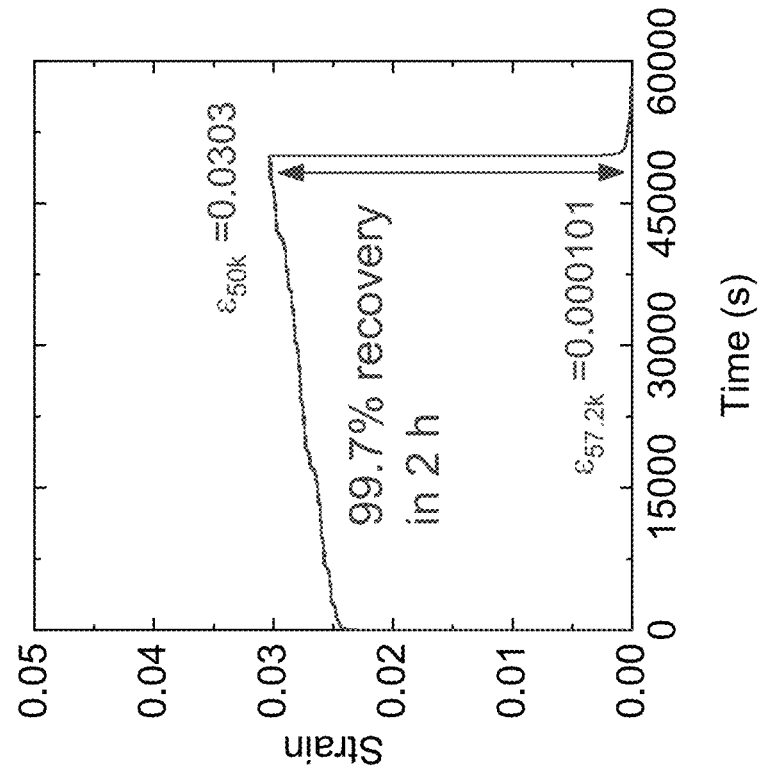
FIG. 6 shows creep results for polymethacrylate networks cross-linked with 5 mol % BiTEMPS methacrylate. The creep test was performed at 70° C. for 50,000 seconds using a constant stress of 3000 Pa followed by creep recovery (zero stress) for 7,200 seconds (2 h).
Figure 5:
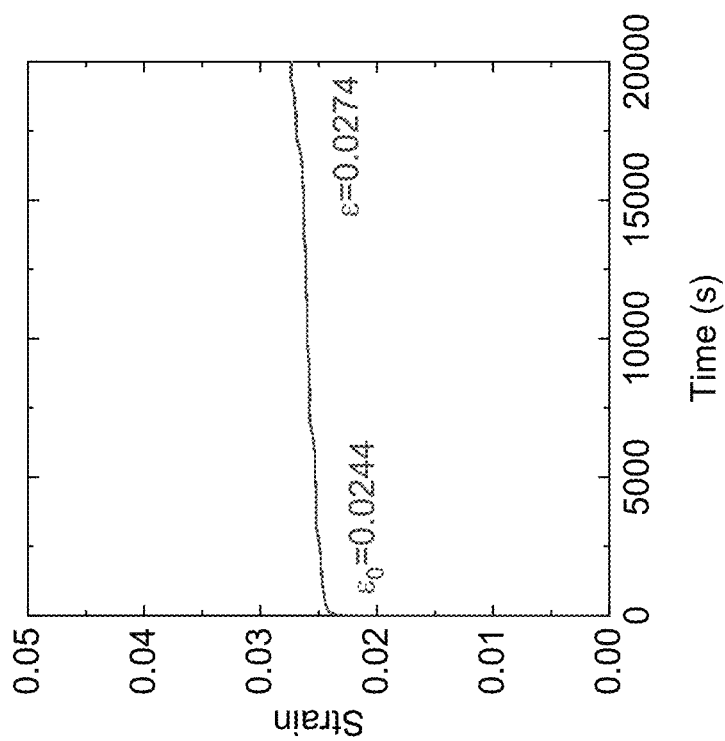
FIG. 5 shows creep results for polymethacrylate networks cross-linked with 5 mol % BiTEMPS methacrylate. The creep test was performed at 70° C. for 20,000 seconds using a constant stress of 3000 Pa.

Creep tests were performed using an Anton Paar MCR302 rheometer with 25 parallel plate fixtures. Creep experiments were conducted under 3000 Pa constant stress at 70° C. The results are shown in FIGS. 5 and 6.

Results and Discussion

To synthesize the cross-linker, the commercially available 2,2,6,6-tetramethyl-4-piperidyl methacrylate (TMPM) was used and it was reacted in excess with sulfur monochloride ($S_2Cl_2$) at −70° C. in the presence of petroleum ether as the solvent to give BiTEMPS methacrylate. Very cold temperature, excess TMPM, and dilute reaction solution significantly suppressed the formation of side products such as polysulfides. BiTEMPS methacrylate synthesis is shown schematically in FIG. 1A.

The reaction proceeded via nucleophilic attack of nitrogen atoms in the piperidine groups of TMPM on the sulfur atoms in $S_2Cl_2$, which yielded BiTEMPS methacrylate. The reaction was completed in less than 1 h, and the solid product was analyzed by Fourier-transform infrared (FTIR) spectroscopy. FIG. 1B shows the FTIR spectra of the starting monomer TMPM and the synthesized cross-linker BiTEMPS methacrylate. Secondary amines typically show a weak N—H stretch peak in the 3300-3400 $cm^{-1}$ region. A peak at 3312 $cm^{-1}$ was observed and assigned to the N—H stretch in TMPM. In contrast, the BiTEMPS methacrylate spectrum shows no absorption in this region, an indication that the amine group in TMPM reacted completely with sulfur monochloride. Complete conversion was also confirmed by $^1$H NMR spectroscopy (FIG. 1C).

To study the effectiveness of BiTEMPS methacrylate as a dynamic cross-linker, BiTEMPS methacrylate was incorporated into a network by copolymerizing hexyl methacrylate (HMA) with 5 mol % BiTEMPS methacrylate via free radical polymerization to give poly(HMA-co-BiTEMPS methacrylate). The commercially available, low-temperature azo initiator V-70 was used to initiate the reaction, allowing polymerization at 25° C. FIG. 4A shows the mechanism of formation and rearrangement of the poly (HMA-co-BiTEMPS methacrylate) network during (re)processing.

The obtained slightly yellowish but transparent gel was washed with dichloromethane/methanol mixtures and dried before characterization and (re)processing. Small pieces of the gel were cut and immersed in toluene and 1,4-dioxane at room temperature and left for 72 h. The pieces were swollen, remained insoluble, and maintained their integrity when they were shaken. The insolubility and swelling behavior confirm the cross-linking of the poly(HMA-co-BiTEMPS methacrylate) network. As a control sample, linear poly (hexyl methacrylate) (PHMA) was synthesized at the same conditions used to generate the network. The transparent PHMA solid dissolved completely within ~1 min when immersed in toluene. Linear PHMA and the poly(HMA-co-BiTEMPS methacrylate) network were thermally characterized by differential scanning calorimetry, with each sample exhibiting a single glass transition temperature ($T_g$). The poly(HMA-co-BiTEMPS methacrylate) network exhibited $T_g$=−21° C., significantly higher than that exhibited by linear PHMA (−6° C.). While cross-linked polymers normally show slightly higher $T_g$s compared to their linear counterparts due to their structural rigidity, this significant increase in $T_g$ may be attributed to the additional rigidity contributed by the cyclic skeleton of BiTEMPS.

To assess the processability and recyclability of the poly (HMA-co-BiTEMPS methacrylate) network, small pieces of the network were cut and processed by compression molding at 130° C. After 1 h of hot pressing followed by 5 min of cooling at room temperature, a ~1-mm thick well-consolidated transparent sheet was obtained. It was noted that the 1-h processing time employed in this study is substantially shorter and more practical than the 48-h processing time employed by Takahashi et al. for polymethacrylate networks cross-linked using a different cross-linker. (Takahashi, A., et al. *ACS Macro Lett.* 2017, 6, 1280-1284.) Thus, BiTEMPS methacrylate has relatively fast dynamics and is effective in introducing dynamic covalent bonds into polymer networks. Molded sheets were successfully reprocessed two times at 130° C. for 1 h, confirming the reprocessability of the synthesized network. The cross-linked natures of the processed and recycled networks were confirmed by their insolubility and swelling in toluene and 1,4-dioxane.

Interestingly, as shown in Table 1, the swelling ratio of the synthesized network decreased and the gel content increased slightly after processing compared to the as-synthesized network. This result suggests that processing of the network led to slightly higher cross-link density. Given the proximity of the network $T_g$ (21° C.) to the synthesis temperature (25° C.) and the relatively quick gelation of the network, it was postulated that the network approached but did not achieve full cross-linking during synthesis after gelation. However, during (re)processing at sufficiently high temperature, slightly more cross-linking could be achieved by bond rearrangements, resulting in a slightly higher cross-link density. The as-synthesized and (re)processed poly(HMA-co-BiTEMPS methacrylate) networks were characterized by FTIR spectroscopy. No changes within error were detected in FTIR spectroscopy, indicating retention of the network's chemical structure after processing and recycling.

TABLE 1

Swelling ratio and gel content of the as-synthesized and (re)processed poly(HMA-co-BiTEMPS methacrylate) networks.

| | Swelling in 1,4-dioxane | | Swelling in toluene | |
| --- | --- | --- | --- | --- |
| Sample | Swelling ratio (%) | Gel content (%) | Swelling ratio (%) | Gel content (%) |
| As-synthesized | 209 | 93.5 | 241 | 94.5 |
| 1$^{st}$ mold | 153 | 97 | 218 | 98.9 |
| 2$^{nd}$ mold | 148 | 98.3 | 199 | 99.9 |
| 3$^{rd}$ mold | 147 | 99.7 | 180 | 99.8 |

Figure 2A:
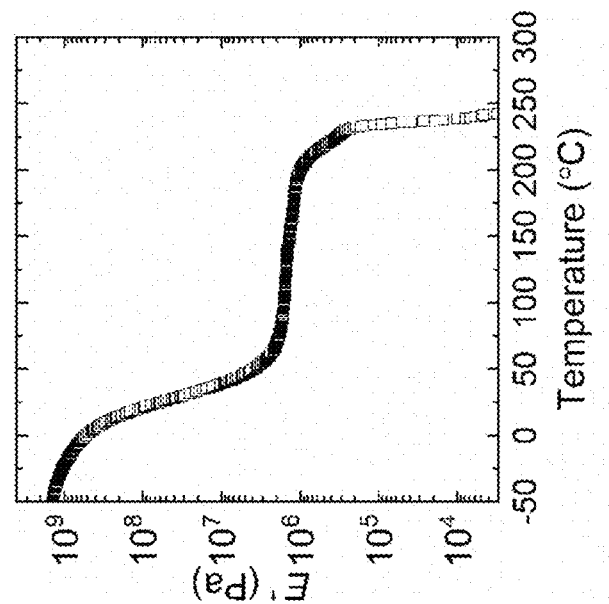
FIG. 2A shows E' and tan δ as functions of temperature for the $1^{st}$ molded (squares), $2^{nd}$ molded (circles), and $3^{rd}$ molded (triangles) polymethacrylate network samples.

To further investigate the cross-linking of the poly(HMA-co-BiTEMPS methacrylate) networks after re(processing), thermomechanical properties were measured using dynamic mechanical analysis (DMA) over a temperature range of −55° C. to 140° C. As shown in FIG. 2A, the tensile storage modulus (E') curves for all the molded network samples displayed a rubbery plateau at high temperature, confirming the cross-linked nature of the materials. The E values in the rubbery plateau region for all samples were identical within error. Based on Flory's ideal rubber elasticity theory, which states that the rubbery plateau modulus is directly proportional to cross-link density, these results indicate full recovery of cross-link density within error after recycling with multiple reprocessing steps. Also, as shown in FIG. 2A and Table 2, all molded network samples exhibited the same $T_g$ values within error as determined from tan δ peaks, which are often used to characterize "shifted" $T_g$ values. This result is consistent with full cross-link density recovery after recycling.

TABLE 2

Properties of polymethacrylate networks as a function of (re)processing steps.

| Sample | E' (MPa)$^a$ | $v_e \times 10^4$ (mol cm$^{-3}$)$^b$ | Shifted $T_g$ (° C.)$^c$ |
| --- | --- | --- | --- |
| 1$^{st}$ mold | 1.48 ± 0.13 | 1.59 ± 0.14 | 37 ± 3 |
| 2$^{nd}$ mold | 1.32 ± 0.13 | 1.42 ± 0.14 | 38 ± 2 |
| 3$^{rd}$ mold | 1.31 ± 0.05 | 1.41 ± 0.05 | 40 ± 1 |

$^a$Determined at 100° C. by DMA.
$^b$Cross-link density, $v_e$, calculated from the rubbery plateau E' value at 100° C. according to Flory's ideal rubber elasticity theory.[42]
$^c$Determined as the temperature where tan δ reaches its maximum value.

Figure 2B:
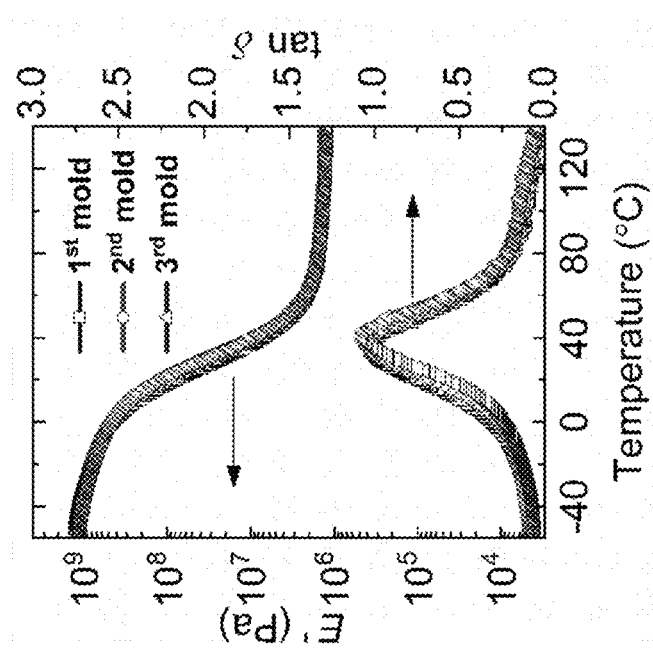
FIG. 2B shows high temperature E' response of the $1^{st}$ molded polymethacrylate network sample.

The 1$^{st}$ mold polymethacrylate network was also characterized by high-temperature DMA to study the flow behavior and thermal stability of the network. As shown in FIG. 2B, the material retained its cross-linked nature up to ~200° C. as demonstrated by the quasi-rubbery plateau in the E' curve. However, a gradual decrease in E' value was observed at temperatures higher than 150° C., indicating some loss in cross-link density at sufficiently high temperature. Above 200° C., E' decreased more sharply with increasing temperature, and above ~230° C. it decreased dramatically and the material flowed like a liquid, signaling a total loss of network structure.

Conclusions

In conclusion, a simple, one-step methodology was developed to synthesize a bis(diakylamino) disulfide dynamic cross-linker (BiTEMPS methacrylate). Because BiTEMPS methacrylate is in dimer form, it does not generate any carbon-centered radicals during reprocessing which could lead to deleterious termination reactions and thus loss of cross-link density with reprocessing. The utility of this dynamic cross-linker in making reprocessable polymer networks from addition-type monomers that exhibit full cross-link density recovery after multiple reprocessing steps was experimentally confirmed, an achievement that heretofore has not been reported in the dynamic polymer network literature. More generally, BiTEMPS methacrylate cross-linker may be used to make a wide range of dynamic polymer networks from any monomers and/or polymers that are amenable to free radical polymerization.

Example 2

Additional poly(hexyl methacrylate) networks were formed using a synthesis similar to that described in Example 1. Briefly, HMA, BiTEMPS methacrylate, and pre-dried DMAc (4.8 ml) were mixed in a 20-mL scintillation vial. Samples were prepared in which the cross-linker, BiTEMPS methacrylate, was added in various mol % with respect to the total amount of monomer and cross-linker. For example, one sample (XLPHMA-5 sample) included 5 mol % BiTEMPS methacrylate with respect to the total amount of monomer and cross-linker. DMAc was added (1.2 ml DMAc/g HMA) to facilitate the dissolution of cross-linker in the monomer. The mixture was stirred at room T until a homogeneous solution was obtained. The solution was then bubbled with $N_2$ gas for 20 min at room T followed by the addition of V-70 initiator (1 mol % w.r.t. total amount of monomer and cross-linker). $N_2$ gas was bubbled again into the solution for an additional 50 min at 25° C. After 50 min, $N_2$ bubbling was stopped, but $N_2$ gas was allowed to flow continuously into the vial and the reaction was allowed to proceed overnight. After 24 h, the reaction was quenched by exposing it to air. The obtained solid was cut into pieces and washed with DCM/methanol mixtures (3/1, 1/1, 1/3 ratios) three times to remove any unreacted reagents. The pieces were then dried in a vacuum oven at 80° C. for 24 h.

Molding, reprocessing, and characterization of the samples were carried out similar to that described in Example 1. The creep characterization of the XLPHMA-5 sample is described in detail below. Remarkably, this sample exhibited almost no creep at 70° C. and 90° C. after 13.9 hours of continuous 3 kPa shear stress.

Shear creep and creep-recovery experiments were performed on ~2 mm-thick disk samples using an Anton-Paar MCR 302 rheometer with 25-mm parallel-plate fixtures. The samples were equilibrated at the test T for at least 5 min before starting the experiment. In creep-recovery tests, the stress (3 kPa unless otherwise noted) was applied for 50,000 s followed by 7,200 s of recovery (zero stress). Creep strain values ($\Delta\varepsilon$) reported in Table 3, below, were calculated as the difference in strain at t=50000 s and t=1800 s ($\Delta\varepsilon=\varepsilon_{50000}-\varepsilon_{1800}$) in order to consider only pure creep, not the initial delayed elastic deformation. The network viscosity ($\eta$) was calculated as function of T as follows:

$$\eta = \sigma/\dot{\gamma} \quad (1)$$

where $\sigma$ is the creep shear stress, and $\dot{\gamma}$ is the shear strain rate calculated from the fitted slope of the linear part of the creep curves (employing creep data between t=30,000 s to t=50,000 s).

The creep performance of the synthesized networks was characterized at 70° C., well above their $T_g$ values. In the creep experiment, a 3.0 kPa shear stress was applied for 50,000 s or 13.9 h during which strain was measured. Upon stress removal, creep recovery was measured for 2 h. FIG. 7A shows creep-recovery curves of the XLPHMA-5 network at 70° C. under different stress levels. XLPHMA-5 exhibited almost no creep over 13.9 h for stress levels ranging from 3 kPa to 10 kPa. For all stress levels tested, after an elastic deformation, the strain remained almost invariant with time, indicating that the network maintained excellent dimensional stability under these conditions. FIG. 7A also shows that the strain scales linearly with stress, which is confirmed by the creep compliance data (creep compliance for a linear viscoelastic material is independent of the applied stress due to the linear relationship between stress and strain at any time for such materials). FIG. 7B shows that the creep compliance, J(t), curves of XLPHMA-5 at different stresses overlap each other, confirming the linear viscoelastic behavior of XLPHMA-5 network under these conditions.

Figure 8A:
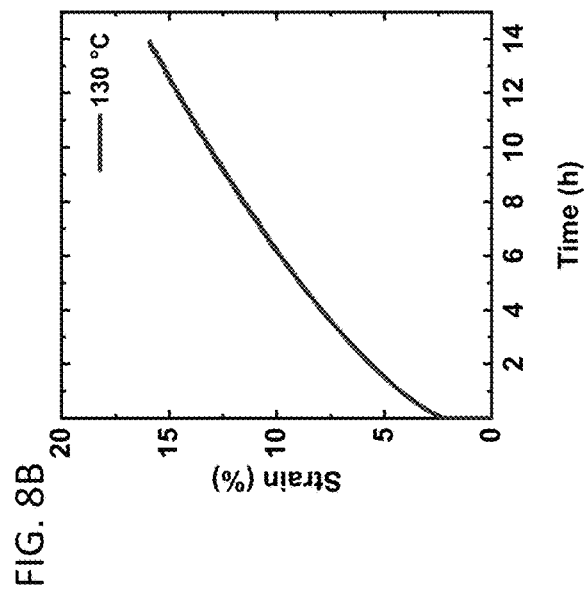
FIG. 8A shows creep and creep recovery curves of the XLPHMA-5 network at different temperatures under a constant stress of 3 kPa.
Figure 8C:
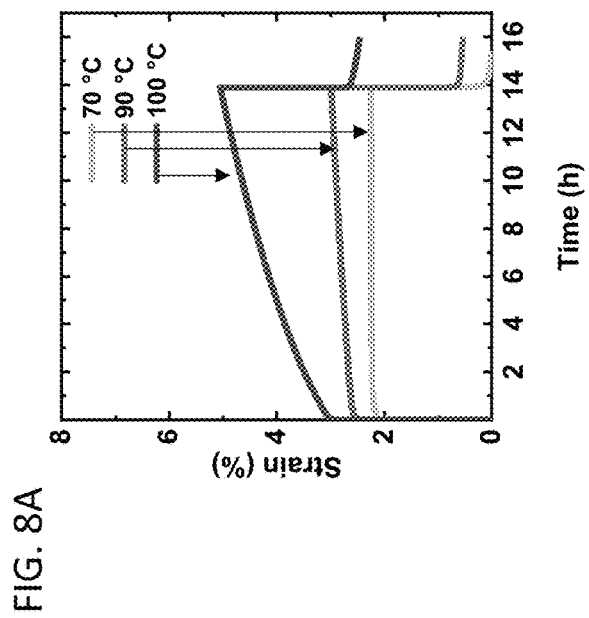
FIG. 8C shows strain recovery as a function of time for the XLPHMA-5 network at different temperatures after 13.9 h of creep testing under a constant stress of 3 kPa.
Figure 8B:
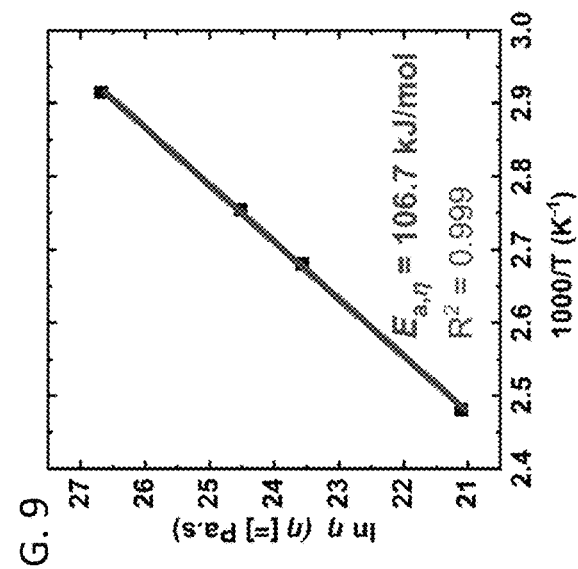
FIG. 8B shows a creep curve of the XLPHMA-5 network at the processing temperature (130° C.) under a constant stress of 3 kPa.

Creep measurements as a function of T are important as they may enable direct determination of the T-dependent viscosity of these materials and thus the viscous flow activation energy. To investigate its T-dependence of viscosity, the creep response of XLPHMA-5 was studied at four T values from 70° C. to 130° C. (FIGS. 8A-8C). The T-dependent viscosity was calculated from the slope of the linear time-dependent region of the creep curves. The viscosity ($\eta$), creep strain ($\Delta\varepsilon$), and creep recovery as functions of T are summarized in Table 3, below. The creep strain of XLPHMA-5 at 70° C. was quantified to be 0.0007 (i.e., 0.07%) after 13.9 h of continuous stress, affirming the network's excellent dimensional stability. The strain at 70° C. was nearly fully recovered less than 30 min after stress removal (FIG. 8C). These results indicate that the BiTEMPS chemistry is extremely slow at 70° C. allowing both creep arrest and full or nearly full strain recovery at this temperature. XLPHMA-5 also maintained its excellent creep resistance at 90° C.; the network exhibits a creep strain of only 0.0038 (i.e., 0.38%). These creep strain values are comparable to values exhibited by static networks. As the disulfide bond in BiTEMPS has been shown to undergo perceptible radical-mediated exchange reactions at 80° C., the BiTEMPS chemistry was likely active, but at very low levels, during 90° C. the creep test. This is also confirmed by the creep-recovery behavior of the network at 90° C. as the strain was incompletely recovered 2 h after stress removal. However, given the negligible creep strain and the low residual strain (0.54%), it is believed that the rate of disulfide dissociation is sufficiently low to nearly arrest creep at 90° C.

TABLE 3

Viscosity, creep strain, strain recovery, and residual strain of the XLPHMA-5 network at different temperatures under a constant creep stress of 3 kPa.

| T (° C.) | $\eta$ (Pa · s)$^a$ | $\Delta\varepsilon^b$ | Instant strain recovery (%)$^c$ | Total strain recovery (%)$^d$ | Residual strain$^d$ |
|---|---|---|---|---|---|
| 70 | $3.85 \times 10^{11}$ | 0.0007 | 78.2 | 99.98 | 0.00000355 |
| 90 | $4.48 \times 10^{10}$ | 0.0038 | 73.3 | 81.85 | 0.00541 |
| 100 | $1.71 \times 10^{10}$ | 0.019 | 45.9 | 51.29 | 0.0246 |
| 130 | $1.45 \times 10^{9}$ | 0.125 | — | — | — |

$^a$Viscosity ($\eta$) was calculated using eqn (1) with the strain rate calculated from the slope of the creep curves between t = 30,000 s and t = 50,000 s.
$^b$Creep strain ($\Delta\varepsilon$) was calculated as the difference in strain between t = 50,000 s and t = 1,800 s.
$^c$Measured 2 s after the stress was removed.
$^d$Measured 1.4 h after the creep was removed for 70° C. and 2.0 h after the creep was removed for 90° C. and 100° C.

At 100° C., XLPHMA-5 exhibited a creep strain of 0.019 or 1.9%, indicating a faster rate of disulfide dissociation under these conditions. Although BiTEMPS chemistry was unable to arrest creep completely at this T, the response of the network is consistent with strong creep resistance at 100° C. Upon increasing the T to the 130° C. processing T, the sample exhibited a more pronounced creep strain, which is expected as the network is malleable at this T One may expect CANs to creep significantly at the processing T. However, although more pronounced, the creep strain was only 12.5% after 13.9 of continuous stress at 130° C. These results suggest that a significant fraction of the dynamic cross-links in XLPHMA-5 remain linked in this dissociative CAN at the processing T and atmospheric pressure.

Figure 9:
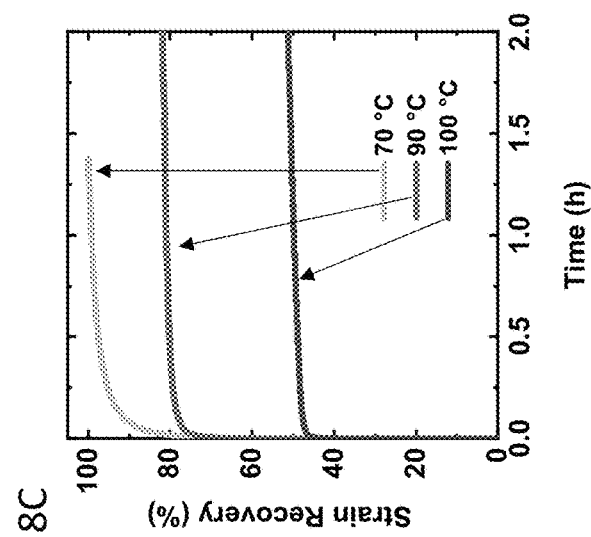
FIG. 9 shows Arrhenius activation energy of viscosity for the XLPHMA-5 network as calculated from creep data taken over a T-range of 70-130° C.

FIG. 9 shows an Arrhenius plot of the T-dependent viscosity calculated from the XLPHMA-5 creep data, confirming that the network viscosity of the dissociative CAN can be fit with an Arrhenius relationship over the tested T range (70-130° C.). The viscous flow activation energy ($E_{a,\eta}$) was calculated from the slope of the linear fit to be 106.7 kJ mol$^{-1}$. It is noteworthy that the $E_{a,\eta}$ value is very close to the value reported for the bond dissociation energy of the disulfide bond in BiTEMPS (109.6 kJ mol$^{-1}$). (See Takahashi, A., et al., Angew. Chem., Int. Ed. 2017, 56, 2016-2021.) This indicates that, for the conditions of this Example, the network creep behavior is dominated by the dynamic chemistry of the cross-linker.

Additional information and experimental data may be found in U.S. Pat. Appln. No. 63/054,365, which is hereby incorporated by reference in its entirety.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A composition for forming a dynamic crosslinked polymer network, the composition comprising
    a dynamic crosslinker having formula R—R"R'N—S—S—NR'R"—R, wherein each R is a polymerizable group comprising a carbon-carbon (C—C) double bond capable of undergoing free radical polymerization, wherein each R' and each R" is an alkyl group, and further wherein one of R' and R" on each respective nitrogen is substituted with a respective R as a substituent thereon, wherein R' and R" are not covalently bound together and do not form a cycloalkyl group containing a respective nitrogen;
    a polymer comprising a C—C double bond capable of undergoing free radical polymerization, a monomer comprising a C—C double bond capable of undergoing free radical polymerization, or combinations thereof; and
    a free radical initiator,
    wherein the dynamic crosslinker does not comprise a urethane group.

2. The composition of claim 1, wherein the composition comprises the monomer.

3. The composition of claim 2, wherein the monomer has formula $R_1R_2C=CR_3R_4$, wherein each of $R_1$-$R_4$ is independently selected from hydrogen, halogen, alkyl, aryl, arylalkyl, alkenyl, arylalkenyl, alkoxycarbonyl, and alkylaminecarbonyl.

4. The composition of claim 2, wherein the monomer is a vinyl monomer.

5. The composition of claim 2, wherein the monomer is an acrylate monomer.

6. The composition of claim 1, wherein each R is —OCO-CHCH$_2$ or —OCOC(CH$_3$)CH$_2$, wherein "—" represents a covalent bond to one of R' and R" on each respective nitrogen.

7. The composition of claim 1, wherein each R" and each R' is a linear alkyl group or a branched alkyl group.

8. The composition of claim 7, wherein each R" and each R' has from 1 to 6 carbons.

9. The composition of claim 8, wherein each R is —OCO-CHCH$_2$ or —OCOC(CH$_3$)CH$_2$, wherein "—" represents a covalent bond to one of R' and R" on each respective nitrogen.

10. A dynamic crosslinked polymer network comprising polymer chains covalently linked by dialkylamino disulfide linkages formed from a dynamic crosslinker having formula R—R"R'N—S—S—NR'R"—R, wherein each R is a polymerizable group comprising a carbon-carbon (C—C) double bond capable of undergoing free radical polymerization, wherein each R' and each R" is an alkyl group, and further wherein one of R' and R" on each respective nitrogen is substituted with a respective R as a substituent thereon, wherein R' and R" are not covalently bound together and do not form a cycloalkyl group containing a respective nitrogen, wherein the dynamic crosslinker does not comprise a urethane group.

11. The network of claim 10, wherein the polymer chains are derived from monomers having formula $R_1R_2C=CR_3R_4$, wherein each of $R_1$-$R_4$ is independently selected from hydrogen, halogen, alkyl, aryl, arylalkyl, alkenyl, arylalkenyl, alkoxycarbonyl, and alkylaminecarbonyl.

12. The network of claim 10, wherein the polymer chains are polyacrylates.

13. A method of forming a dynamic crosslinked polymer network, the method comprising generating free radicals from the free radical initiator in the composition of claim 1, to induce reactions of the dynamic crosslinker with C—C double bonds of the polymer, the monomer, or both, to form a dynamic crosslinked polymer network.

14. A method of reprocessing the network of claim 10, the method comprising heating the network to a first temperature that induces reversible dialkylamino disulfide bond cleavage; reshaping the network; and cooling the network to a second temperature at which the reversible dialkylamino disulfide bond cleavage is arrested.

15. The method of claim 14, wherein the heating, reshaping, and cooling step provides a first reprocessed network and the heating, reshaping, and cooling step is repeated at least 2 additional times to provide an additional reprocessed network exhibiting full recovery of crosslinking density.

* * * * *